United States Patent [19]

Blackwell et al.

[11] 4,132,823

[45] Jan. 2, 1979

[54] POLY(ARYLENE SULFIDE) RESIN COATINGS

[75] Inventors: Jennings P. Blackwell; Donnie G. Brady, both of Bartlesville, Okla.

[73] Assignee: Phillips Petroleum Company, Bartlesville, Okla.

[21] Appl. No.: 780,556

[22] Filed: Mar. 23, 1977

[51] Int. Cl.$^2$ .................. B32B 27/28; B32B 15/20; B32B 15/08; B32B 27/08
[52] U.S. Cl. .................................... 428/215; 428/419
[58] Field of Search .............................. 428/215, 419

[56] References Cited

U.S. PATENT DOCUMENTS

| | | | |
|---|---|---|---|
| 3,179,635 | 4/1965 | Endrey | 428/419 |
| 3,616,186 | 10/1971 | Blackwell | 428/419 |
| 3,953,653 | 4/1976 | Doss | 428/419 |

*Primary Examiner*—James R. Hoffman

[57] ABSTRACT

Poly(amic acid)s convertible to polyimides are used as primers for copper-containing substrates prior to coating the substrate with an arylene sulfide polymer, thereby resulting in improved adhesion of the arylene sulfide polymer coating after curing to the substrate.

8 Claims, No Drawings

POLY(ARYLENE SULFIDE) RESIN COATINGS

This invention relates to arylene sulfide polymer coatings exhibiting improved adhesion to metal substrates. In accordance with another aspect, this invention relates to the use of poly(amic acid)s convertible to polyimides as primers prior to coating copper-containing substrates with arylene sulfide polymers. In accordance with another aspect, this invention relates to copper-containing substrates coated with superposed layers of at least one layer of a polyimide and at least one layer of arylene sulfide polymer. In accordance with still another aspect, this invention relates to copper-containing substrates coated with poly(phenylene sulfide) in which an aromatic poly(amic acid) convertible to a polyimide is applied as a primer to the copper-containing substrate prior to application of the poly(phenylene sulfide) coating to improve the adhesion of the poly(phenylene sulfide) to the copper substrate.

Arylene sulfide polymers are known to be useful as coatings for metal substrates, including copper substrates. However, the bond between the arylene sulfide polymer coating and a substrate such as copper is not as strong as would be preferred, and conventional methods for improving adhesion of a polymer coating to a metal substrate, e.g., treatment of the substrate by degreasing with a solvent, cleaning with an acid, or grit-blasting, do not provide the degree of adhesion desired for some applications.

Accordingly, an object of this invention is to provide a novel coated structure of copper and a normally solid poly(arylene sulfide) resin.

Another object of this invention is to provide a process for consistently obtaining good adhesion of the poly(arylene sulfide) resin to a copper-containing metal substrate.

A further object of this invention is to provide an improved coating of an arylene sulfide polymer to a copper-containing substrate.

Other objects, aspects, and the several advantages of this invention will be apparent to those skilled in the art upon a study of the specification and the appended claims.

In accordance with this invention, an aromatic poly(amic acid) is applied as a primer to a metal substrate comprising at least principally copper, the poly(amic acid) primer is converted to a polyimide by heating, an arylene sulfide polymer is applied to the polyimide coating on the metal substrate, and the composite coating is heated to achieve cure of the arylene sulfide polymer. Adhesion of the arylene sylfide polymer to the substrate in the resulting laminate is substantially better than that obtained without use of the poly(amic acid) primer.

The metal substrate comprising at least principally copper can be substantially pure copper, or it can be an alloy such as brass or bronze of which more than 50 weight percent is copper. This substrate can be in any shape desired. Thus, substrates in the form of wire, sheet, machined or forged objects, and the like are suitable for production of the laminates of the invention. Coupons have been demonstrated to be a suitable form of substrate. If desired, the substrate can be cleaned, grit-blasted, treated with hydrochloric acid, or subjected to other conventional surface treatments prior to application of the primer coating in accordance with this invention.

Aromatic poly(amic acid)s, prepolymers convertible to polyimides by heating, which can be employed as primers in the process of this invention include polymers having recurring units each of which can be represented by the formula

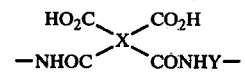

where X is selected from the group consisting of

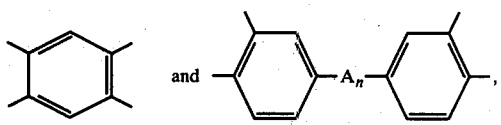

Y is selected from the group consisting of

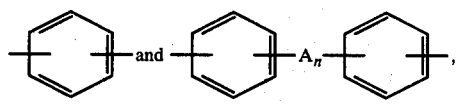

n is 0 or 1, A is selected from the group consisting of oxygen, sulfur, sulfonyl, carbonyl, and $-CR_2-$, and each R is selected from the group consisting of hydrogen, methyl, and trifluoromethyl. Although each X in the prepolymer molecule can be the same, it is not necessary that the X in each recurring unit be the same. Similarly, although each Y in the prepolymer molecule can be the same, it is not necessary that the Y in each recurring unit be the same. Furthermore, the aromatic poly(amic acid) can be used as a mixture of two or more such prepolymers. If desired, the prepolymer can be employed as an end group-modified prepolymer, e.g., as a nadic anhydride-terminated poly(amic acid).

The aromatic poly(amic acid)s for use in this invention can be prepared by processes known in the art, including processes such as are described in "Encyclopedia of Polymer Science and Technology," Vol. 11, John Wiley & Sons, Inc., New York, N.Y. (1969), pages 247–272. Some of the aromatic poly(amic acid)s are commercially available.

The nature of the arylene sulfide polymer employed is not critical provided it is fusible and can be cured by heating to form a normally solid coating. The arylene sulfide polymer can be linear, branched, or lightly crosslinked. Although the arylene sulfide polymers presently preferred are linear, branched, or lightly crosslinked phenylene sulfide polymers, other arylene sulfide polymers such as linear, branched, or lightly crosslinked biphenylylene sulfide polymers; linear, branched, or lightly crosslinked oxydiphenylene sulfide polymers; linear, branched, or lightly crosslinked sulfonyldiphenylene sulfide polymers; or the like, with or without lower alkyl substituents, can be employed. By "lower alkyl" is meant alkyl having 1 to about 6 carbon atoms such as methyl, ethyl, propyl, isobutyl, pentyl, hexyl, and the like. If desired, arylene sulfide copolymers containing recurring arylene sulfide units of two or more different structures, or blends of arylene sulfide polymers, can be used.

Although the melt flow (ASTM D 1238-70, modified to a temperature of 316° C. using a 5-kg weight, value expressed as g/10 min) of the arylene sulfide polymer can vary over a wide range, generally it will be within the range of about 5 to about 10,000, preferably about 20 to about 8,000. Applicable arylene sulfide polymers can be produced, e.g., from polyhalo aromatic compounds, alkali metal sulfides, and organic amides, as described in U.S. Pat. No. 3,354,129, or from dihalobenzenes, alkali metal sulfides, organic amides, and alkali metal carboxylates, as described in U.S. Pat. No. 3,919,177. If desired, such polymers can be subjected to mild curing by heating to reduce the melt flow, as described in U.S. Pat. No. 3,717,620, prior to use in the process of this invention.

The manner in which the poly(amic acid) primer is applied to the metal substrate is not critical. For example, the primer can be applied by electrostatic spraying or other form of powder spraying, by fluidized bed techniques, or as a slurry in a liquid such as hexane or diethyl ether in which the primer exhibits little solubility, followed by volatilization of the liquid. In a presently preferred method the primer is applied as a solution in a solvent for the primer, e.g., in solvents such as formamide, N-methylformamide, N,N-dimethylformamide, N-methylacetamide, N,N-dimethylacetamide, N,N-diethylformamide, N-methyl-2-pyrrolidone, tetramethylurea, hexamethylphosphoramide, pyridine, dimethyl sulfoxide, dimethyl sulfone, sulfolane, and the like. Usually the primer in such solutions will constitute within the range of about 5 to about 50 weight percent of the solution used. After application of the solution to the substrate, the solvent is evaporated. Regardless of the method of application to the substrate, the primer on the substrate is heated at a temperature within the range of about 150° C. to about 350° C., preferably within the range of about 200° C. to about 300° C., for a period of time within the range of about 1 minute to about 90 minutes, preferably within the range of about 2 minutes to about 30 minutes, thereby curing the poly(amic acid) prepolymer to a polyimide. If desired, multiple application and curing of the primer can be used. Although the thickness of the resulting cured coating is not critical, generally it will be within the range of about 0.5 mil to about 5 mils. Thus, the amount of primer applied to the substrate, as one or more coatings, preferably is such as to provide a cured primer coating having a thickness within this range.

The arylene sulfide polymer can be applied to the polyimide-coated substrate by conventional methods. Examples of suitable methods include electrostatic spraying or other form of powder spraying, fluidized bed techniques, or slurry techniques using a carrier liquid such as water, methyl alcohol, ethylene glycol, heptane, or the like. When the substrate is in a form such as sheet or wire, extrusion techniques can be used to apply the arylene sulfide polymer. If desired, substances such as other polymers, e.g., poly(tetrafluoroethylene), and fillers and pigments, e.g., mica, silica, titanium dioxide, ferric oxide, cobaltic oxide, molybdenum disulfide, and the like, can be present in the arylene sulfide polymer. After removal of carrier liquid, if used, the arylene sulfide polymer on the polyimide-coated substrate is heated at a temperature within the range of about 280° C. to about 450° C., preferably within the range of about 330° C. to about 400° C., for a time within the range of about 1 minute to about 5 hours, preferably within the range of about 15 minutes to about 2 hours, to cure the arylene sulfide polymer. If desired, multiple application and curing of the arylene sulfide polymer can be employed. Although the thickness of the resulting cured arylene sulfide polymer layer is not critical, generally it will be within the range of about 1 mil to about 20 mils. Therefore, the amount of the composition comprising arylene sulfide polymer applied to the polyimide-coated substrate, as one or more coatings, preferably is such as to provide a cured arylene sulfide polymer layer having a thickness within this range.

EXAMPLES

In each of the following examples the solution of primer employed was either NR-150A2 polyimide precursor solution (duPont) or P13N polyimide precursor solution (Ciba-Geigy). The NR-150A2 polyimide precursor solution is an N-methyl-2-pyrrolidone solution of a poly(amic acid) which is a condensation product of the dianhydride of 1,1,1,3,3,3-hexafluoro-2,2-bis(3,4-dicarboxyphenyl)propane with bis(4-aminophenyl) ether, the solution having a solids content of 45 weight percent and a viscosity of 50 poises. The P13N polyimide precursor solution is an N,N-dimethylformamide solution of a nadic anhydride-terminated poly(amic acid) having a backbone comprised of alternating units derived from bis(4-aminophenyl)methane and the dianhydride of 3,3',4,4'-tetracarboxybenzophenone, the solution having a solids content of 38-42 weight percent, a viscosity at 25° C., of 250-350 centipoises, a specific gravity of 1.09-1.10, and an acid number of about 3.8. The partially cured poly(phenylene sulfide) (PPS) was prepared, in accordance with the method of U.S. Pat. No. 3,717,720, by heating poly(p-phenylene sulfide) at about 475° F. (246° C.) in air until the melt flow was reduced, as desired, to 1100 or to 200 (ASTM D 1238-70, modified to a temperature of 316° C. using a 5-kg weight, value expressed as g/10 min). The poly(p-phenylene sulfide), whether applied as a coating or used in the preparation of the partially cured PPS for coating application, had a melt flow of approximately 5,000, determined by the above procedure, and was produced by use of p-dichlorobenzene, sodium sulfide, and N-methyl-2-pyrrolidone in accordance with the method of U.S. Pat. No. 3,354,129. The solution of primer was brushed on a copper substrate at about 25° C., after which the solvent was evaporated and the primer-coated substrate was heated to cure the primer. The cured primer had a thickness of about 0.5-1 mil. The partially cured PPS was then applied at about 25° C. by electrostatic spraying or by spraying as an aqueous slurry, and the coated substrate was heated to cure the PPS. The cured PPS layer had a thickness of about 1-4 mils. The composite coating on the substrate was then aged by heating the coated substrate in air at various temperatures for various periods of time, adhesion of the coating to the substrate being evaluated at about 25° C. by scalpel probing under magnification. The adhesion thus observed was compared with that obtained from a comparable test specimen prepared and aged in like manner except that no primer was employed.

EXAMPLE I

In four series of tests the polyimide precursor, a poly(amic acid), in NR-150A2 polyimide precursor solution was evaluated as a primer for a copper substrate to be coated with PPS.

In a first series of tests cleaned and grit-blasted copper coupons were immersed for five minutes in a solution prepared by mixing concentrated hydrochloric acid and water in a volume ratio of 1 to 4, respectively. The coupons were then rinsed in water and dried. NR- 150A2 polyimide precursor solution, described above, was brushed on each of the coupons, the coupons were dried in air for 30 minutes, and the poly(amic acid) coating on the coupons was cured to a polyimide by heating at 250° C. for five minutes. A top coat of partially cured PPS (melt flow 1100) was electrostatically sprayed onto the polyimide coatings, after which the coupons were heated at 370° C. for 30 minutes to cure the coatings. In a comparable series of control tests cleaned and grit-blasted copper coupons were treated in like manner except that the application, drying, and curing of the polyimide precursor prior to application of the partially cured PPS was omitted. The copper coupons having the polyimide and PPS coatings, as well as the control coupons having only a PPS coating, were subjected to aging in air at 204° C. for various periods of time, and the adhesion of the coatings to the substrate was evaluated. The results are shown in Table I.

TABLE I

| Aging Time | Quality of Adhesion | |
|---|---|---|
| at 204° C, hr | Primer Used | Primer Not Used |
| 2 | Excellent | Fair to Poor |
| 96 | Good | Poor |
| 312 | Excellent | Poor |
| 504 | Good | Poor |
| 677 | Poor | Poor |

In a second series of tests NR-150A2 polyimide precursor solution was brushed on cleaned and grit-blasted copper coupons, the coupons were dried in air for one hour, and the poly(amic acid) coating on the coupons was cured to a polyimide by heating at 250° C. for five minutes. A top coat of partially cured PPS (melt flow 1100) was electrostatically sprayed onto the polyimide coatings, after which the coupons were heated at 370° C. for 30 minutes to cure the coatings. In a comparable series of control tests, cleaned and grit-blasted copper coupons were treated in like manner except that the application, drying, and curing of the polyimide precursor prior to application of the partially cured PPS was omitted. The copper coupons having the polyimide and PPS coatings, as well as the control coupons having only a PPS coating, were subjected to aging in air at 170° C. for various periods of time, and the adhesion of the coatings to the substrate was evaluated. The results are shown in Table II.

TABLE II

| Aging time | Quality of Adhesion | |
|---|---|---|
| at 170° C, hr | Primer Used | Primer Not Used |
| 2 | Good to excellent | Fair |
| 264 | Fair | Good |
| 508 | Fair | Poor |
| 654 | Fair | Poor |
| 988 | Good | Poor |
| 1344 | Fair | Poor |
| 1754 | Good | Poor |
| 2023 | Good | Poor |
| 2448 | Fair | Poor |
| 2712 | Fair | Fair |
| 3050 | Fair | Poor |
| 3555 | Fair to good | Poor to fair |

In a third series of tests NR-150A2 polyimide precursor solution was brushed on cleaned and grit-blasted copper coupons, the coupons were dried in air for one hour, and the poly(amic acid) coating on the coupons was cured to a polyimide by heating at 250° C. for five minutes. A top coat of partially cured PPS (melt flow 1100) was electrostatically sprayed onto the polyimide coatings, after which the coupons were heated at 370° C. for 30 minutes to cure the coatings. In a comparable series of control tests, cleaned and grit-blasted copper coupons were treated in like manner except that the application, drying, and curing of the polyimide precursor prior to application of the partially cured PPS was omitted. The copper coupons having the polyimide and PPS coatings, as well as the control coupons having only a PPS coating, were subjected to aging in air at 150° C. for various periods of time, and the adhesion of the coatings to the substrate was evaluated. The results are shown in Table III.

TABLE III

| Aging Time | Quality of Adhesion | |
|---|---|---|
| at 150° C, hr | Primer Used | Primer Not Used |
| 2 | Excellent | Very good |
| 48 | Excellent | Good |
| 120 | Excellent | Fair to poor |
| 168 | Excellent | Fair to poor |
| 216 | Excellent | Poor |
| 336 | Excellent | Poor |
| 504 | Excellent | Poor |
| 672 | Excellent | Poor |
| 840 | Excellent | Poor |
| 1032 | Excellent | Poor |
| 1296 | Excellent | Poor |
| 1680 | Excellent | Fair |
| 2016 | Excellent | Good |
| 2400 | Excellent | Fair to good |
| 2544 | Excellent | Good |
| 3010 | Excellent | Good |

In a fourth series of tests, NR-150A2 polyimide precursor solution was brushed on cleaned and grit-blasted copper coupons, the coupons were dried in air for 30 minutes, and the poly(amic acid) coating on the coupons was cured to a polyimide by heating at 250° C. for five minutes. A top coat of poly(p-phenylene sulfide) (melt flow approximately 5000) was sprayed, as an aqueous slurry containing about 35 weight percent polymer, onto the polyimide coatings, after which the coupons were heated at 370° C. for 30 minutes to cure the coatings. In a comparable series of control tests, cleaned and grit-blasted copper coupons were treated in like manner except that the application, drying, and curing of the polyimide precursor prior to application of the poly(p-phenylene sulfide) was omitted. The copper coupons having the polyimide and PPS coatings, as well as the control coupons having only a PPS coating, were subjected to aging in air at 204° C. for various periods of time, and the adhesion of the coatings to the substrate was evaluated. The results are shown in Table IV.

TABLE IV

| Aging Time | Quality of Adhesion | |
|---|---|---|
| at 204° C, hr | Primer Used | Primer Not Used |
| 2 | Good | Fair |
| 46 | Good | Fair |
| 120 | Good | Poor |
| 336 | Fair | Poor |

Thus, as shown in the four series of tests in this example, adhesion of the PPS coating to the substrate was generally improved by use of the poly(amic acid) as a primer.

EXAMPLE II

In a series of tests, the polyimide precursor, a nadic anhydride-terminated poly(amic acid), in P13N polyimide precursor solution was evaluated as a primer for a copper substrate to be coated with PPS. In each test the copper substrate was a cleaned and grit-blasted copper coupon. In each instance the polyimide precursor solution, with or without prior dilution, was brushed on the coupon, the coupon was dried, and the poly(amic acid) coating was cured to a polyimide by heating. A top coat of partially cured PPS (melt flow 1100) was electrostatically sprayed onto the polyimide coatings, after which the coupons were heated at 370° C. for 20-30 minutes to further cure the coatings. In comparable control tests, cleaned and grit-blasted copper coupons were treated in like manner except that the application, drying, and curing of the polyimide precursor prior to application of the partially cured PPS was omitted. The copper coupons having the polyimide and PPS coatings, as well as the control coupons having only a PPS coating, were subjected to aging in air at elevated temperatures for two hours, and the adhesion of the coatings to the substrate was evaluated. The results are shown in Table V.

TABLE V

| Primer | Primer Cure Conditions | 2-Hr. Aging Temp., °C | Adhesion |
|---|---|---|---|
| None | — | 230 | Fair |
| None | — | 230 | Fair |
| None | — | 204 | Poor |
| P13N[1] | 5 Min. at 250° C | 230 | Fair |
| P13N[2] | 5 Min. at 250° C | 230 | Good |
| P13N[1] | 3 Min. at 310° C | 230 | Fair |
| P13N[2] | 3 Min. at 310° C | 230 | Good |
| P13N[1] | 3 Min. at 250° C | 204 | Good |

[1] Primer was applied as P13N polyimide precursor solution, without dilution.
[2] Primer was applied as a solution prepared by mixing 12.5 parts by weight P13N polyimide precursor solution with 21.5 parts by weight N,N-dimethylformamide.

Thus, the adhesion of the PPS coating to the substrate was fair to good when the nadic anhydride-terminated poly(amic acid) was used as a primer whereas it was only poor to fair when the primer was not employed.

We claim:

1. An arylene sulfide polymer coated structure comprising:
   (a) a copper-containing metal substrate in which at least 50 weight percent of the substrate is copper, having bonded thereto:
   (b) a layer of a polyimide and
   (c) a layer of an arylene sulfide polymer cured and bonded to said polyimide layer.

2. An article according to claim 1 wherein the polyimide of (b) is formed by heating an aromatic poly(amic acid) having recurring units each of which can be represented by the formula $$\begin{matrix} HO_2C & & CO_2H \\ & \diagdown X \diagup & \\ -NHOC & & CONHY- \end{matrix},$$

where X is selected from the group consisting of

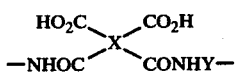

and

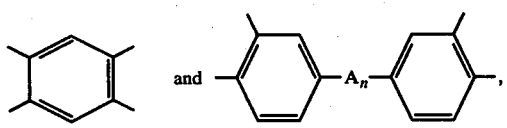

Y is selected from the group consisting of

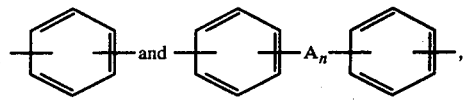

n is 0 or 1, A is selected from the group consisting of oxygen, sulfur, sulfonyl, carbonyl, and —CR$_2$—, and each R is selected from the group consisting of hydrogen, methyl, and trifluoromethyl.

3. A structure according to claim 2 wherein (b) is a condensation product of the dianhydride of 1,1,1,3,3,3-hexafluoro-2,2-bis(3,4-dicarboxyphenyl)propane with bis(4-aminophenyl) ether or a nadic anhydride-terminated poly(amic acid) having a backbone comprised of alternating units derived from bis(4-aminophenyl)methane and the dianhydride of 3,3',4,4'-tetracarboxybenzophenone and (c) is poly(phenylene sulfide).

4. A structure according to claim 1 wherein (b) is a layer of 0.5 mil to about 5 mils and (c) is a layer of about 1 mil to about 20 mils.

5. A copper-containing substrate in which at least 50 weight percent of the substrate is copper coated with superposed layers of
   (a) at least one layer of a polyimide bonded to said substrate and
   (b) at least one layer of a poly(arylene sulfide) resin bonded to a layer of said polyimide.

6. A substrate according to claim 5 wherein
   (a) is derived from an aromatic poly(amic acid) having recurring units each of which can be represented by the formula $$\begin{matrix} HO_2C & & CO_2H \\ & \diagdown X \diagup & \\ -NHOC & & CONHY- \end{matrix},$$

where X is selected from the group consisting of

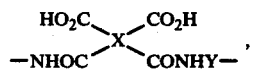

and

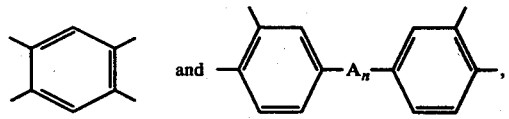

Y is selected from the group consisting of

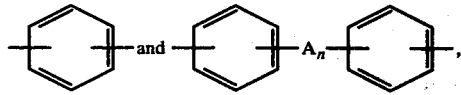

n is 0 or 1, A is selected from the group consisting of oxygen, sulfur, sulfonyl, carbonyl, and —CR$_2$—, and each R is selected from the group consisting of hydrogen, methyl, and trifluoromethyl, and
   (b) is a poly(phenylene sulfide).

7. An article according to claim 5 wherein the thickness of each layer of (a) is about 0.5 mil to about 5 mils and (b) is about 1 mil to about 20 mils.

8. An article according to claim 5 wherein (b) contains at least one filler and/or pigment.

* * * * *